United States Patent Office 3,139,326
Patented June 30, 1964

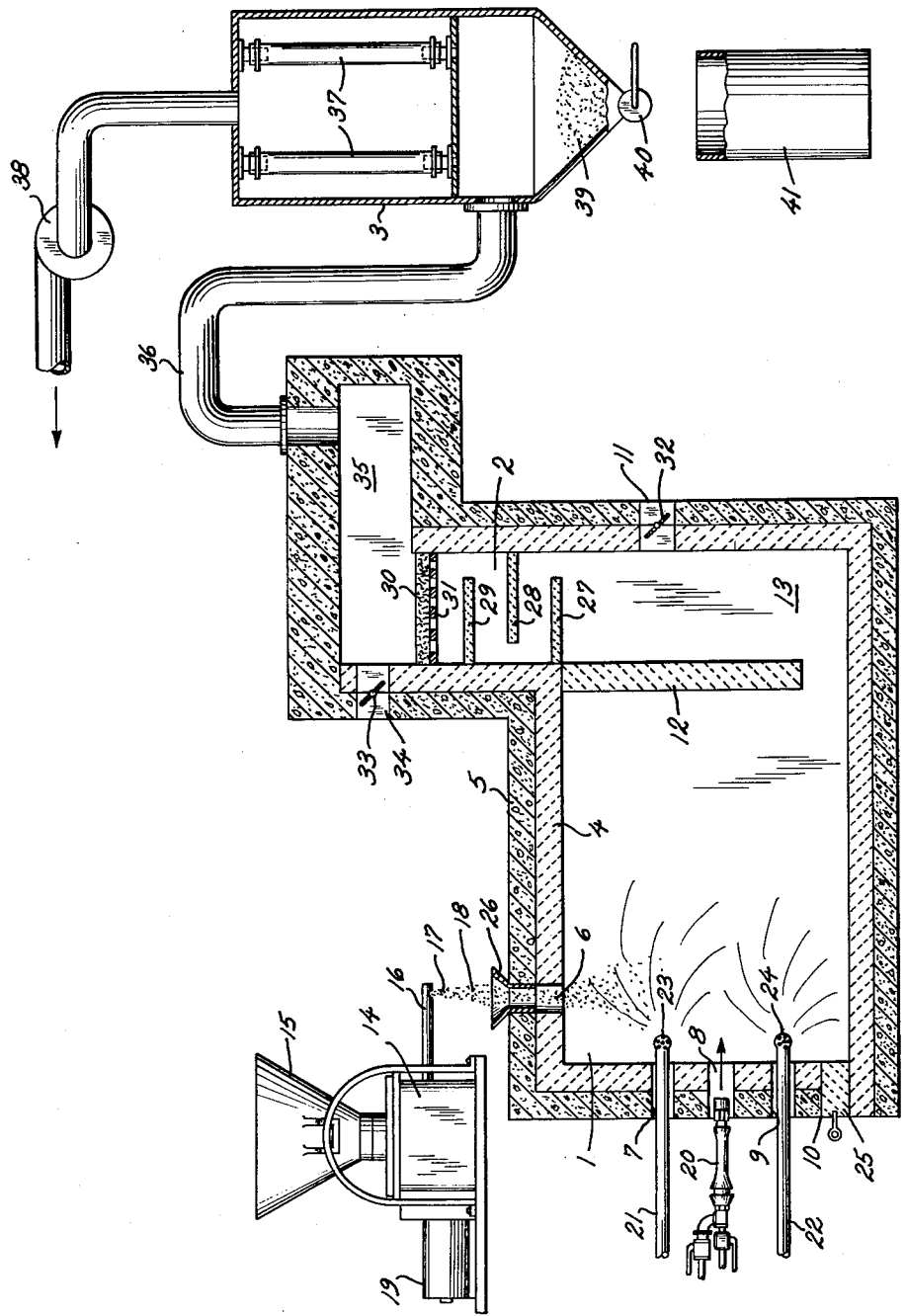

3,139,326
METHOD AND APPARATUS FOR THE PRODUCTION OF MOLYBDENUM TRIOXIDE
Walter H. Costello, Easton, Pa., assignor to J. T. Baker Chemical Company, Phillipsburg, N.J., a corporation of New Jersey
Filed Jan. 29, 1960, Ser. No. 5,499
6 Claims. (Cl. 23—17)

This invention relates to a process of producing molybdenum trioxide. More particularly the invention relates to the preparation of highly pure molybdenum trioxide from molybdenum concentrates, especially those containing a high percentage of molybdenum disulfide.

Molybdenum is a very versatile and important element which has many laboratory and industrial applications. Some of these require molybdenum or molybdenum salts of a high degree of purity. Molybdenum trioxide is particularly valuable in that it can be converted to practically any other molybdenum salt or can be readily reduced to metallic molybdenum.

The most common source of molybdenum is molybdenite which may be concentrated by flotation processes to obtain a crude material containing as much as 85 to 88 percent molybdenum disulfide. However, this crude material contains numerous impurities such as iron oxides and sulfides, silica, sodium and potassium salts, oils from the flotation process and other elements such as arsenic, bismuth, antimony, phosphorus and copper in various forms. In the roasting process, which is employed to convert the sulfide into the oxide, gases such as sulphur dioxide and sulphur trioxide are given off and small amounts of sulfuric acid are formed. These add to the difficulties encountered in obtaining pure molybdenum trioxide.

There are many methods of converting molybdenum ores and concentrates to molybdenum trioxide, but those which give a highly pure product require elaborate and expensive equipment, a multiplicity of operating steps and give low yields. The present invention is characterized by the fact that molybdenum trioxide of 99.5 percent purity, or better, and in yields in excess of 95 percent can be obtained in one continuous operation in a single unitary apparatus.

Although the process and apparatus of the present invention finds particular use in the one-step recovery of pure molybdenum trioxide from readily available concentrates of molybdenum ores, it may be used with slight modification to obtain high purity molybdenum trioxide from relatively impure molybdenum trioxide which has been prepared by other methods.

Molybdenum trioxide has been prepared by processes which involve the steps of roasting molybdenite concentrates to obtain crude molybdenum trioxide which is sublimed and collected in bag filters. The roasting process has been carried out in various types of equipment such as Herreshoff furnaces, rotating cylinders and doughnut-shaped hearths while a stream of hot air is passed over a bed of the crude material to sweep away the $MoO_3$ which is formed and sublimed.

Molybdenum trioxide begins to sublime near its melting point. This places severe restrictions on the conditions that may be used in some of the prior art processes. If the temperature is too low, the sublimation will be incomplete, and if too high, the material will melt in the apparatus. As a result much of the molybdenum trioxide is left behind in the roasted residue which must be given additional treatment if this valuable material is to be fully recovered. In any event, the yields of these prior art processes are notoriously low.

In addition, sulfur dioxide and sulfur trioxide gases are formed during the roasting process and these are highly corrosive to the apparatus. At lower temperatures the sulfur trioxide combines with water vapor to form sulfuric acid which tends to be adsorbed upon the molybdenum trioxide which is condensed and collected by the bag filters. Efforts to overcome this last named difficulty have given rise to processes in which the roasting step and the sublimation step are carried out separately, in different kinds of equipment. This, of course, adds to the cost of the process, and results in even lower yields than are obtained by the combined roasting and sublimation process.

The principal objects of the present invention are to provide a process and apparatus which may be used to obtain molybdenum trioxide of high purity, in high yields and at a low cost from readily obtainable but impure molybdenum concentrates. The advantages of the present invention, aside from accomplishing the objects just named, are that it combines the separate roasting and sublimation steps of prior art processes into a single flash oxidation-sublimation step. The need for complicated and expensive apparatus, processing ore concentrates in bulk quantities from a bed container or hearth and the need of adding extraneous materials to the ore concentrate are eliminated.

The present invention is characterized by a single flash oxidation-sublimation step wherein finely divided particles of the impure molybdenum disulfide are oxidized and sublimed while in suspension in an oxidizing atmosphere in a furnace. The sublimed $MoO_3$ is separated while in vapor phase from solid particles of impurities and then condensed and collected at temperatures wherein other impurities such as sulfuric acid and arsenic trioxide remain in vapor phase. As a result the collected molybdenum trioxide is of very high purity and free from contaminants which are usually associated with this material.

In order that the invention may be more clearly understood, reference is made to the accompanying drawing which is an elevational view, partly in cross-section of a furnace, separator, and collector such as may be used in practicing the invention.

A preferred embodiment of the apparatus which may be used in practicing the invention comprises a furnace 1, a dust separator 2 and a bag filter 3. The furnace is lined with a refractory material 4 such as refractory brick or some other suitable material capable of withstanding temperatures of about 2500° F. and higher. Insulating brick 5 may cover the furnace to prevent excessive heat losses. The furnace is provided with a number of openings 6, 7, 8, 9, 10 and 11 which serve various important functions as will be described hereinafter. The furnace also has a baffle 12 of silicon carbide or other heat resistant material. A passageway 13 leading from the furnace permits exit of gases which include the products of combustion, excess air, the desired molybdenum trioxide in vapor state and various volatile impurities.

Means capable of feeding finely divided molybdenum concentrates to the furnace at a constant but variable rate is shown at 14. A suitable device for this purpose is sold under the trade name Vibra Screw and comprises a hopper 15 in which the powdered concentrate may be placed, a delivery tube 16 with opening 17 through which the powdered material 18 drops. An electric motor (not shown) drives the reduction gear in housing 19, which in turn drives a feed screw (not shown) enclosed within the delivery tube 16. The motor also vibrates the hopper 15, the feed screw, and the delivery tube 16 to assure free flow of material from the hopper to the delivery tube outlet 17. Other suitable devices for feeding the powdered molybdenum material to the furnace may, of course, be employed. For instance, it may be blown into the furnace with the pre-heated air supply to be described.

A burner nozzle 20 for introducing heat into the furnace is positioned in one of the openings 8 of the furnace as shown. This nozzle delivers a hot flame which may be a mixture of natural gas and air, or oil and air, or other source of heat to the furnace. Hot air is also introduced into the furnace through one or more of the openings 7 and 9 by means of lines 21 and 22 which are inserted into the furnace through holes 7 and 9, respectively. These air lines are provided with means at each of the ends thereof 23 and 24 for introducing the air into the furnace in a turbulent manner so that the atmosphere within the furnace has a high degree of turbulence.

Opening 10 may be sealed with a refractory block 25 which can be removed so that the furnace may be cleaned through opening 10 from time to time as may be required.

A funnel-shaped element 26 is fitted through opening 6 to provide a port of entry for the powdered molybdenum from the feeding device 14.

It will be understood, of course, that the burner nozzle 20 and the air lines 21 and 22 may be supported in any suitable manner and are of such size that they may be readily removed from the furnace through the ports for inspection or replacement.

The solids removal chamber 2 may comprise baffles 27, 28 and 29 of heat resistant material such as silicon carbide. An alternative construction (not shown) which has proved to be acceptable comprises a column of ceramic shapes, such as saddles, supported in suitable manner and permitting free flow of hot gases therethrough.

The principal filtering element which removes very small particles of solid materials which pass by baffles 12, 27, 28 and 29 is shown at 30. This filter element is preferably made of ceramic fibers which have been woven, felted, or formed into a filter media. The filter element is supported by a suitable structure 31 which permits passage of hot gases. A filtering material which has been found to be satisfactory is sold under the trade name Fiberfrax and is made of long, staple ceramic fibers resistant to temperatures as high of 2300° F.

A damper 32 or other suitable control may be installed in opening 11 to control a flow of cooling air into the solids removal chamber 13 and another damper 33 may be installed in port 34 in the space above the filter element controlling the flow of cooling air into the gases and vapors passing through the filter.

The hot gases pass through the dust filter 30 at temperatures of at least 1800° F. and pass through chamber 35 into duct work 36 which may be uninsulated and of corrosion-resistant metal to the bag filter house 3.

During the passage of these gases from the dust filter they are cooled to below 1200° F. at which temperature all of the molybdenum trioxide in the gas mixture has cooled and condensed to solid molybdenum trioxide. This solid material is collected in the bag filter house. The hot gases carrying sulfuric acid, arsenic trioxide and other condensible impurities in vapor form pass through collecting bags 37 which may be made of woven fiber glass or ceramic fibers and are removed by blower 38 to suitable disposal equipment. The pure molybdenum trioxide 39 which collects in the bottom of the bag filter house is removed periodically through a rotary valve 40 to suitable receptacles 41.

The successful operation of the apparatus which is described is dependent upon the maintenance of critical conditions within the apparatus. These conditions and the operation of the apparatus will now be described in more detail.

To start the process, the furnace is first heated to operating temperature by introducing heat through nozzle 20. A mixture of natural gas and air has been found to be satisfactory; however other sources of heat including electric heating elements within the furnace itself may be employed if desired. When the furnace comes up to operating temperature, 1800° F. or higher, pre-heated air is introduced through lines 21 and 22 to provide an excess of oxygen in the furnace. A stream of finely divided molybdenum-containing material such as molybdenite ore concentrate is allowed to fall from the delivery tube 16 through port 6 into the furnace. This falling material is caught up in the turbulent flowing atmosphere and is ignited. The chemical reaction by which molybdenum disulfide is converted to molybdenum trioxide is exothermic, and, accordingly, the amount of heat added to the furnace by way of the combustion mixture and the pre-heated air should be carefully regulated to maintain a temperature within the combustion chamber of at least 1800° F. Temperatures as high as 2300° F. have been used, and, higher temperatures would be preferred if the materials of construction of the apparatus are such as would withstand these higher temperatures. Ordinarily, with present day materials, the furnace operates at a temperature of about 2200° F.

The amount of air introduced into the furnace should be approximately 100 percent in excess of that required to oxidize the molybdenum disulfide to molybdenum trioxide to obtain complete oxidation and best yields. The pressure within the furnace is maintained below atmospheric pressure, usually about −0.01 to −0.02 inch of water, and there is a tendency for some air to enter into the various openings shown in the drawing. This, however, is immaterial as long as the temperature is maintained as described. The air entering the furnace through lines 21 and 22 is usually pre-heated to 500° F. or higher, but this is not necessary providing enough heat is supplied to maintain the furnace at the desired operating temperatures. The amount of heat necessary will depend somewhat upon the way in which the furnace is insulated.

As the finely divided molybdenum concentrate enters the hot atmosphere of the furnace, it is immediately flash-oxidized and sublimed to molybdenum trioxide. Nonvolatile products in the concentrate remain as fine solid particles which tend to fall to the floor of the furnace. Removal of these solid particles is further aided by the baffles which have been previously described, and still smaller particles are removed by the ceramic filter.

The hot gases leaving the furnace at a temperature of about 2200° F. or higher should be cooled so that they do not damage the ceramic filter element. The filter elements presently available have a maximum temperature resistance of approximately 2300° F., and, therefore, the gases should be cooled to below this temperature, but ordinarily should be above 1800° F. A small amount of air, above five to ten percent by volume, may be introduced through port 11 to aid in cooling. Dilution of the molybdenum trioxide vapor with hot gases to lower its partial pressure will make it possible to filter at temperatures lower than 1800° F., for instance as low as 1350° F. without molybdenum trioxide condensing out.

The gases passing through the ceramic filter may be further cooled by air passing through port 34 to less than about 1200° F. It is preferred that the hot gases have a temperature between 500–600° F. in the bag house. The amount of air introduced through port 34 for cooling purposes may be decreased by the use of heat exchangers within chamber 35 or by radiation from the duct work 36.

The temperatures of the gases within the bag house should be in excess of 350° F. because sulfuric acid which is formed from sulfur trioxide coming from the molybdenum disulfide and from moisture in the gases may be adsorbed at lower temperatures on the collected molybdenum trioxide and substantially lower its purity. It has been found, for example, that when the molybdenum trioxide is collected at temperatures of the order of 250° F. the molybdenum trioxide product may have as much as 5 to 8 percent of sulfuric acid adsorbed on it. This, of course, is an undesirable result and further heating of the molybdenum trioxide at temperatures in excess of 500° F. is necessary to remove the acid.

The product, molybdenum trioxide, having a purity of 99.7 percent collects in the hopper of the bag house and may be removed through a rotary valve 40 and collected in a suitable container 41 from time to time. The gases containing sulfur dioxide and other impurities may be exhausted by blower 38 to waste or suitable recovery means.

Although the invention has been described in particular reference to the treatment of concentrates of molybdenite, it will be understood that the apparatus can be used with slight changes for the purification of crude molybdenum trioxide. In this event, more heat must be added inasmuch as the heat of combustion of the molybdenum disulfide is no longer available. Also, it is not necessary to heat an excess of oxygen to carry out the chemical reaction involved in the conversion. All that is necessary is to supply sufficient heat to raise the temperature within the furnace to 1800° F. or higher whereby the finely divided molybdenum trioxide will be flash-sublimed and to supply enough hot air and turbulence within the furnace to carry the sublimed material through the filter and bag house.

I claim:

1. A method of preparing molybdenum trioxide of high purity which comprises the steps of suspending molybdenum disulfide having a particle size smaller than about 20 mesh in the atmosphere of a chamber heated to at least 1800° F. while also introducing into said chamber a flow of preheated air whereby a turbulent atmospheric condition of a temperature of at least 1800° F. is created and substantially all of the suspended finely divided molybdenum disulfide is oxidized and sublimed substantially instantaneously into molybdenum trioxide, separating the sublimed molybdenum trioxide from non-volatile impurities while the gases have a temperature in excess of 1350° F., cooling the molybdenum trioxide vapors to within the range 350° F. to 1200° F. and separating the condensed molybdenum trioxide from the hot gases associated with it.

2. A method of preparing molybdenum trioxide from finely divided molybdenum-bearing ore concentrates which comprises the steps of suspending the molybdenum-containing material in oxidizing gases at temperatures of at least 1800° F. and sufficiently high to oxidize molybdenum disulfide contained in said ores to molybdenum trioxide and to volatilize said molybdenum trioxide while suspended in said oxidizing atmosphere, separating the volatile material from the non-volatile gaseous material by passing the hot gases through a filter element at a temperature in excess of 1350° F., cooling the volatile material to a temperature within the range 350° F. to 1200° F. sufficiently low to condense the molybdenum trioxide therein and separating the condensed molybdenum trioxide from the non-condensed volatile gases.

3. A method of preparing molybdenum trioxide which comprises the steps of suspending impure molybdenum disulfide in an oxidizing atmosphere at a temperature of at least 1800° F., whereby the molybdenum disulfide is oxidized to molybdenum trioxide and the latter volatilized while in suspension in said atmosphere, mixing a stream of air with the hot atmosphere containing said volatilized molybdenum trioxide whereby its partial pressure is reduced and the temperature of the atmosphere is reduced to not less than 1350° F., separating the volatile material from finely divided solids entrained in said atmosphere, cooling the volatile gases to a temperature below 1200° F. to condense the molybdenum trioxide but above 350° F. and separating the condensed molybdenum trioxide from the non-condensed gases at a temperature above 350° F.

4. A method of preparing molybdenum trioxide of high purity which comprises the steps of suspending impure molybdenum-containing material in a turbulent oxidizing atmosphere having a temperature of at least 1800° F. and sufficiently high to volatilize molybdenum trioxide contained in said finely divided material while it is suspended in said turbulent hot atmosphere, passing the hot gases through a filter element at a temperature above 1350° F. to separate non-volatile material from the volatilized molybdenum trioxide, cooling the volatile material to a temperature below 1200° F. to condense the molybdenum trioxide and separating the condensed molybdenum trioxide from the non-condensed volatile gases.

5. A method of preparing molybdenum trioxide from finely divided molybdenum-bearing ore concentrates which comprises the steps of suspending the molybdenum-containing material in oxidizing gases at temperatures of at least 1800° F. and sufficiently high to oxidize molybdenum disulfide contained in said ores to molybdenum trioxide and to volatilize said molybdenum trioxide while suspended in said oxidizing atmosphere, separating the volatile material from the non-volatile material by passing the hot gases through a filter element at a temperature in excess of 1350° F., cooling the volatile gaseous material to a temperature within the range 500° F. to 600° F. sufficiently low to condense the molybdenum trioxide therein and separating the condensed molybdenum trioxide from the non-condensed volatile gases.

6. Apparatus for the preparation of pure molybdenum trioxide which comprises a combustion chamber, means for heating the atmosphere within said combustion chamber to temperatures of at least 1800° F., means for introducing air into said combustion chamber in a turbulent manner, means for introducing finely divided molybdenum containing material into said combustion chamber whereby it is caught in a hot turbulent air stream and oxidized and sublimed while suspended in the atmosphere within the combustion chamber, a baffled passageway leading from said combustion chamber, a heat resistant filter element in said passageway, means for introducing air into said passageway to mix with the volatile gases before passing through said filter element to dilute and cool the said volatile gas stream to not less than 1350° F. and means for introducing cooling air to said passageway after the said filter element whereby the gases may be cooled to temperatures within the range 350° F. to 1200° F., means to separate condensed molybdenum trioxide from said cooled gases, and means for recovering said condensed molybdenum trioxide.

References Cited in the file of this patent

UNITED STATES PATENTS

| | | |
|---|---|---|
| 1,118,150 | Robertson | Nov. 24, 1914 |
| 1,299,560 | Doerner | Apr. 8, 1919 |
| 1,308,735 | Farland | July 1, 1919 |
| 1,366,626 | Alexander | Jan. 25, 1921 |
| 1,426,602 | Robertson | Aug. 22, 1922 |
| 1,967,235 | Ferkel | July 24, 1934 |
| 2,579,107 | Bertolus | Dec. 18, 1951 |
| 2,772,153 | West et al. | Nov. 27, 1956 |